(12) United States Patent
Nitschke et al.

(10) Patent No.: US 6,545,489 B1
(45) Date of Patent: Apr. 8, 2003

(54) CIRCUIT CONFIGURATION FOR MEASURING THE RESISTANCES OF A PRESSURE-SENSITIVE RESISTOR MAT

(75) Inventors: Werner Nitschke, Ditzingen (DE); Hermann Maier, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/720,503

(22) PCT Filed: Apr. 19, 2000

(86) PCT No.: PCT/DE00/01225
  § 371 (c)(1),
  (2), (4) Date: Apr. 24, 2001

(87) PCT Pub. No.: WO00/64697
  PCT Pub. Date: Nov. 2, 2000

(30) Foreign Application Priority Data

Apr. 27, 1999 (DE) .......................... 199 19 034

(51) Int. Cl.⁷ .............................. G01R 27/08
(52) U.S. Cl. ...................... 324/713; 324/691
(58) Field of Search ................ 340/666, 667, 340/541; 49/264; 324/713, 691

(56) References Cited

U.S. PATENT DOCUMENTS

| | | | |
|---|---|---|---|
| 4,336,522 A | | 6/1982 | Graham ............... 340/459 |
| 4,808,972 A | * | 2/1989 | Nicholls ............. 340/541 |
| 5,636,477 A | * | 6/1997 | Hulse ................ 49/264 |

FOREIGN PATENT DOCUMENTS

| | | |
|---|---|---|
| DE | 3634052 | 4/1988 |
| DE | 3634053 | 4/1988 |
| DE | 196 06 527 | 8/1997 |
| DE | 197 27 193 | 1/1999 |
| EP | 0 79 1834 | 8/1997 |
| EP | 0 89 5091 | 2/1999 |

* cited by examiner

Primary Examiner—Christine Oda
(74) Attorney, Agent, or Firm—Kenyon & Kenyon

(57) ABSTRACT

A circuit arrangement with low sensitivity to faults and few components has a first resistor connected in parallel to the resistor mat and a second resistor connected in series to the parallel circuit. A controllable voltage regulator, to which a control voltage dependent on the resistance of the resistor mat is supplied, is also connected in parallel to the series circuit. The output voltage of the voltage regulator can be tapped as a voltage divider.

3 Claims, 2 Drawing Sheets

US 6,545,489 B1

CIRCUIT CONFIGURATION FOR MEASURING THE RESISTANCES OF A PRESSURE-SENSITIVE RESISTOR MAT

FIELD OF THE INVENTION

The present invention relates to a circuit arrangement for detecting measured values of a pressure-sensitive resistor mat located in a vehicle seat for detecting seat occupancy, where a first resistor is connected in parallel to the resistor mat, and a voltage divider is provided at which a measured voltage dependent on the resistance of the resistor mat can be tapped.

BACKGROUND INFORMATION

A circuit arrangement of this type is known from German Patent Application No. 197 27 193. A pressure-sensitive resistor mat in a vehicle seat can be used to determine the weight of the person, or a child seat or another object occupying the vehicle seat. Based on this information, a control unit makes a determination for restraining means (such as airbags) as to whether, based on the vehicle seat occupancy, the airbag should even be triggered in the event of a vehicle crash, or how forcefully it should be expanded to protect the person occupying the vehicle seat.

FIG. 3 shows a circuit arrangement designed according to the cited related art for detecting the measured values of a pressure-sensitive resistor mat. In this circuit, resistor RM represents the pressure-dependent, variable resistance of the resistor mat. A series circuit including a resistor R and a diode D is connected in parallel to resistor RM of the resistor mat. A first transistor T1 with a voltage divider R11, R21 set to a supply voltage of +5V is connected to one output of this parallel circuit, and a second transistor T22 with a voltage divider R12, R22 set to a supply voltage of +5V is connected to the other output of the parallel circuit.

To subsequently test the resistor mat and determine whether a faulty interruption has occurred, first transistor T1 is activated at its input E1, where a current flows exclusively through resistor mat RM, due to the diode polarity, and resulting measured voltage UM1 is tapped at voltage divider R11, R22. Measured voltage UM1 undergoes an analog/digital conversion and is then evaluated by a control unit. If instantaneous pressure-dependent resistance RM of the resistor mat is to be measured, second transistor T2 is activated at its input E2. In this case, diode D is polarized in the forward direction, and a current flows across both branches of parallel circuit RM, R, D. A measured voltage UM2, which undergoes an analog/digital conversion and is then evaluated in the control unit, is tapped at voltage divider R11, R21. For the evaluation, measured voltage UM2 undergoes a threshold value decision determining whether or not the vehicle seat is occupied.

In the case of the described circuit arrangement, a very low current (approximately 80 μA) flows through the resistor mat to determine measured voltage UM2. This very low current can lead to significant measurement errors if low shunts occur in the line conducting the measured signal. A shunt of 100 kW, for example, causes measured voltage UM2 to deviate from the actual measured value by 33%. The circuit arrangement described is relatively expensive, since it requires two transistors with two voltage dividers.

SUMMARY OF THE INVENTION

The object of the present invention is therefore to provide a circuit arrangement which responds to faulty shunts on the measured signal line with minimal measured signal deviations and can operate with a relatively small number of components.

The object mentioned above having the features of claim 1, is achieved in that a second resistor is connected in series to the parallel circuit including the resistor mat and the first resistor; a controllable voltage regulator, to which a control voltage dependent on the resistance of the resistor mat is supplied, is connected in parallel to the series circuit; and the output voltage of the voltage regulator is present at a voltage divider. This circuit arrangement, which requires only a few resistors and one voltage regulator, acts like an impedance transformer used to increase the current flowing through the resistor mat for signal evaluation, thereby making the measured signal insensitive to shunts on the measured signal line.

Advantageous embodiments of the present invention are described in the subclaims. The control voltage for the voltage regulator is thus tapped between the second resistor and the parallel circuit including the resistor mat and the first resistor. A temperature-compensated voltage regulator is advantageously used.

DETAILED DESCRIPTION

Figure 1:
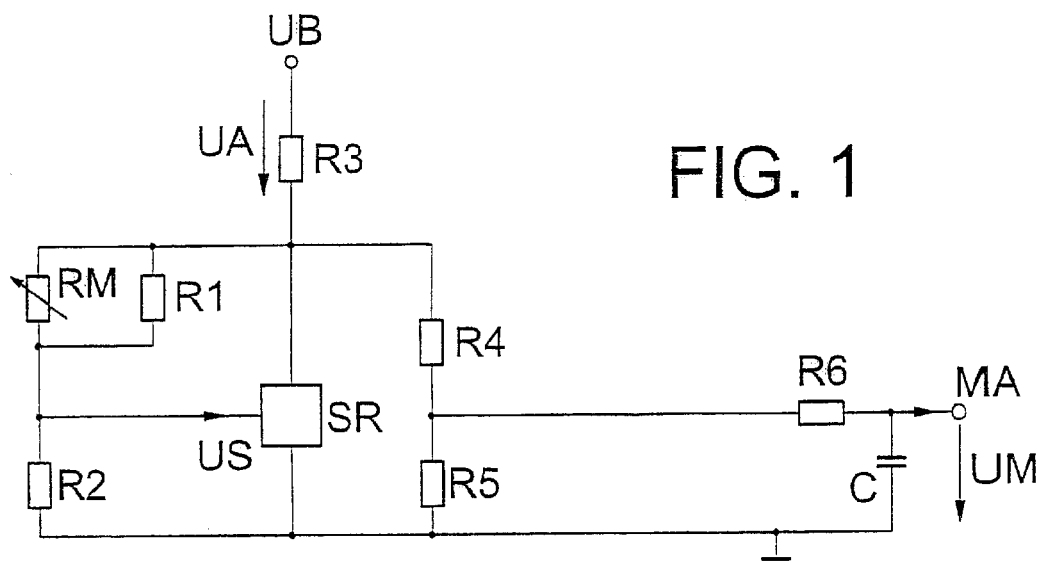
FIG. 1 shows a circuit arrangement according to the present invention.

In FIG. 1, the resistor mat, whose resistance varies as a function of pressure, is identified by resistor RM. A first resistor R1 is connected in parallel to resistor RM of the resistor mat, and a second resistor R2 is connected in series to this parallel circuit. A voltage regulator SR, which is preferably temperature-compensated, is connected in parallel to the series circuit including second resistor R2 and both resistors RM and R1. The control voltage for voltage regulator SR is tapped between second resistor R2 and the parallel circuit including resistor mat RM and first resistor R1. Voltage regulator SR and series circuit R2, R1, RM connected in parallel to it are connected by one terminal to ground and by the other terminal to a supply voltage UB, which is the vehicle battery voltage. Stabilized output voltage UA of voltage regulator SR can be tapped at a resistor R3 connected between supply voltage UB and voltage regulator SR. A voltage divider including resistors R4 and R5 is connected to this resistor R3. Both resistors R4 and R5 of the voltage divider are connected in series to voltage regulator SR between ground and the terminal of resistor R3. Measured voltage UM is tapped toward ground between both resistors R4 and R5 of the voltage divider.

Measured voltage UM present at output MA of the circuit arrangement is supplied in a known manner to an analog/digital converter (not illustrated), and the digital measured value is subsequently evaluated in a control device. Resistor R6 inserted in front of output MA in the measuring line protects the downstream analog/digital converter against a short-circuit on the measuring line after supply voltage UB. A capacitor C inserted between the measuring line and ground protects the downstream analog/digital converter against incident electromagnetic radiation and against disturbing voltage peaks in supply voltage UB.

Both resistors R1 and R2 are selected (e.g., R1=50 kW, R2=24 kW) so that a control voltage US of approximately 2.5 V is set for voltage regulator SR at a 50-kW resistance RM of the resistor mat. Voltage regulator SR regulates fluctuations in supply voltage UB, e.g., between 8 and 18 V, so that output voltage UA dependent on the resistance of the resistor mat remains at resistor R3 regardless of fluctuations in supply voltage UB. Due to a low-impedance decoupling of measured voltage UM via voltage divider R4 and R5 (e.g., R4=R5=1 kW), a shunt of 100 kW, for example, on the measuring line would produce a deviation of only around 0.5% between measured voltage UM and the actual measured value.

Figure 2:
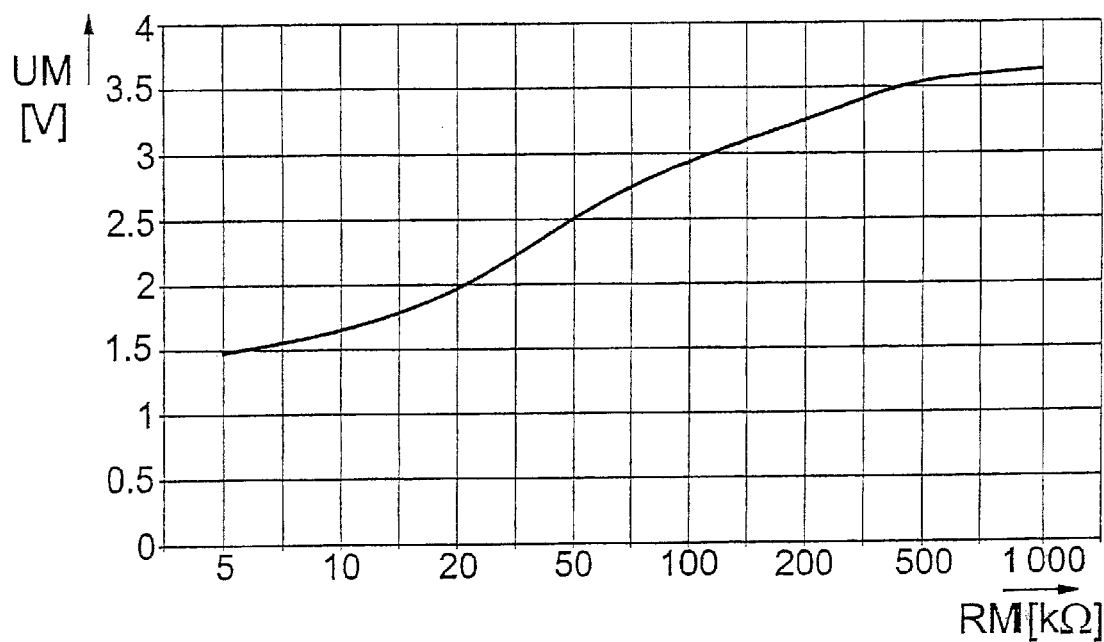
FIG. 2 shows a measured voltage curve as a function of the resistance of the resistor mat.

FIG. 2 shows the curve of measured voltage UM that can be tapped at output MA as a function of resistance RM of the resistor mat. This curve shows, for example, that measured voltage UM equals 3.5 V when the resistor mat has a resistance RM of 1 kW, which occurs when the resistor mat is not subjected to a pressure load, i.e., when the vehicle seat is unoccupied. The higher the pressure on the resistor mat, the lower its resistance RM, and consequently measured voltage UM decreases according to the illustrated curve. If resistor R1 connected in parallel to resistor mat RM is interrupted, control voltage US for voltage regulator SR increases very sharply, which is reflected by a very high measured voltage UM at output MA and can be clearly detected by the control unit.

Figure 3:
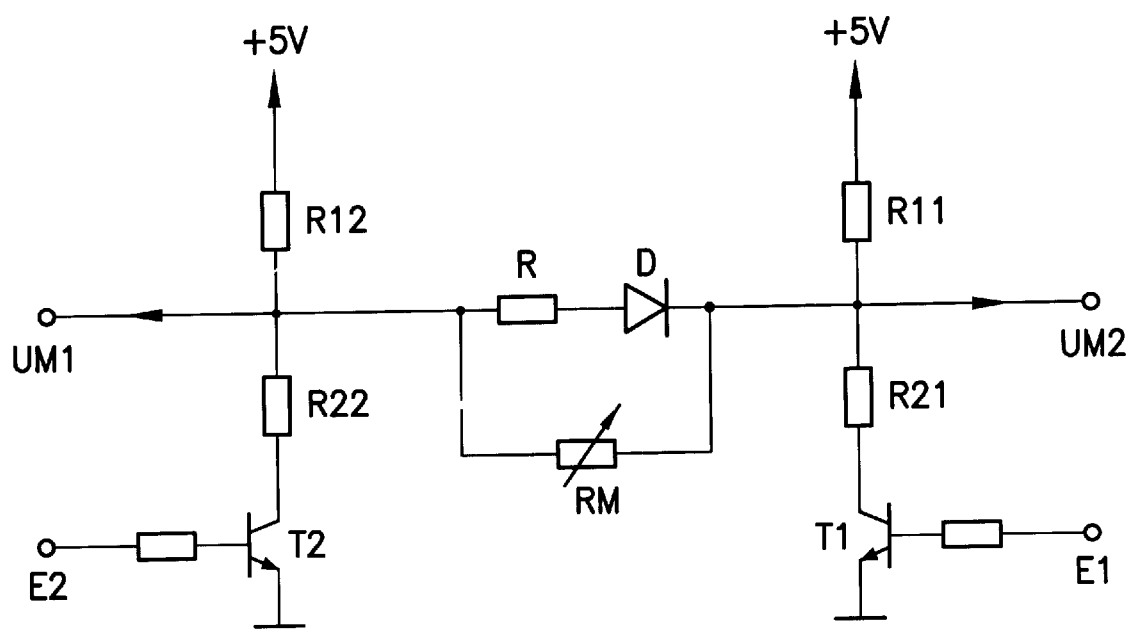
FIG. 3 shows a circuit arrangement according to the related art.

FIG. 3 shows the circuit arrangement described earlier in the preamble and designed according to the related art for detecting measured values of a pressure-sensitive resistor mat located in a vehicle seat. Compared to the related art, the circuit according to the present invention shown in FIG. 1 clearly makes do with significantly fewer components, which can be easily integrated into a connector attached to the resistor mat or into the resistor mat itself. The circuit arrangement according to the present invention also has fewer measured signal connections than the circuit according to the related art.

What is claimed is:

1. A circuit arrangement for detecting measured values of a pressure-sensitive resistor mat located in a vehicle seat for detecting seat occupancy, comprising:
    a first resistor connected in parallel to the resistor mat, forming a parallel circuit;
    a voltage divider at which a measured voltage dependent on a resistance of the resistor mat can be tapped;
    a second resistor connected in series to the parallel circuit, forming a series circuit; and
    a controllable voltage regulator, to which a control voltage dependent on the resistance of the resistor mat is supplied, the regulator connected in parallel to the series circuit, an output voltage of the regulator being applied to the voltage divider.

2. The circuit arrangement of claim 1, wherein the control voltage of the voltage regulator is tapped between the second resistor and the parallel circuit.

3. The circuit arrangement of claim 1, wherein the voltage regulator is temperature-compensated.

* * * * *

UNITED STATES PATENT AND TRADEMARK OFFICE
CERTIFICATE OF CORRECTION

PATENT NO. : 6,545,489 B1
DATED : April 8, 2003
INVENTOR(S) : Werner Nitschke et al.

It is certified that error appears in the above-identified patent and that said Letters Patent is hereby corrected as shown below:

Column 1,
Line 35, change "T22" to -- T2 --.

Signed and Sealed this

Fifteenth Day of June, 2004

JON W. DUDAS
*Acting Director of the United States Patent and Trademark Office*